UNITED STATES PATENT OFFICE.

E. D. WILLIAMS, OF PHILADELPHIA, PENNSYLVANIA.

IMPROVEMENT IN SOLIDIFIED FUEL FROM COAL-DUST.

Specification forming part of Letters Patent No. 27,401, dated March 6, 1860.

*To all whom it may concern:*

Be it known that I, E. D. WILLIAMS, of the city and county of Philadelphia, and State of Pennsylvania, have invented certain Improvements in the Preparation of a Solidified Fuel from Coal-Dust, Peat, and Other Like Substances; and I do hereby declare the following to be a full, clear, and exact description of the same.

My invention consists in compounding and preparing a solidified fuel from coal-dust, peat, and other like substances by mixing the same with a glutinous paste or size, subjecting the composition to pressure in molds, and subsequently drying the pressed blocks, as fully described hereinafter, so that the blocks may be hard and portable, may serve as an efficient fuel, and retain their solidity until gradually consumed by the fire.

To enable others skilled in the art to practice my invention, I will now proceed to describe the materials and process by which I carry it into effect.

I prepare a paste or size of rye or wheat flour by mixing it with water and boiling the compound in the usual manner, the paste being sufficiently fluid to mix readily and intimately with the coal-dust or coal-screenings.

Sour flour, unfit for culinary purposes, may be used for making this paste, as also may any suitable vegetable or animal glutinous substances.

A paste made of twenty pounds of rye-flour will be found amply sufficient for solidifying one ton of anthracite-coal dust, when the compound is submitted to the following process: The paste having been intimately mixed with the coal-dust, a suitable portion of the compound is placed in a mold, which may be similar to that of an ordinary brick-making machine, and subjected to a forcible pressure.

If a quantity sufficient to form a block of the size of a building-brick has to be compressed, the pressure necessary for producing the required solidity will be from seventy to one hundred tons. By this pressure the small proportion of glutinous substance, which without the pressure would not serve to unite the particles of mineral, becomes so thoroughly and closely impregnated with the latter that the whole becomes a solid mass, which, when properly dried, is so hard as to admit of being carried about without breaking, and yet so brittle as to be readily shattered by a blow from a hammer or other suitable instrument.

The blocks should be dried immediately after being pressed, and somewhat rapidly, in order to prevent any decomposition of the glutinous paste, the temperature required for the drying process being equal to or above that of summer heat.

During the compression of the compound in the molds the mass may be perforated so as to insure an increased solidity, and so as to obviate the tendency of the blocks to crack during the process of drying.

For ordinary purposes the blocks are ready for use as fuel immediately after drying; but when they have to be used for long voyages or have to be stored in localities which subject them to long-continued exposure to moisture I give them a coating of asphaltum, resin, or other water-proof combustible substances or compounds, in order to prevent them from absorbing moisture.

In applying my invention to solidifying peat a greater proportion of glutinous paste is required. The dry peat is granulated, mixed with the paste, subjected to pressure in molds, and subsequently dried, precisely in the same manner as that described in reference to the coal-dust; or the peat may in some instances be mixed with the paste immediately after it has been dug from the ground, and subsequently pressed and dried.

Masses of moss or partially-decayed vegetable substances may be treated in a similar manner.

I am aware that the solidifying of coal-dust, peat, &c., for the purpose of converting it into an available fuel has been heretofore practiced by mixing it with adhesive substances, and in some instances subjecting the compound to pressure in molds. The adhesive materials heretofore used, however, for this purpose have been either pitch, rosin, gas-tar, asphalt, or compounds of these and similar materials, which melt during combustion and allow the condensed mass of coal-dust, peat, &c., to assume the original granulated form in which it is so ill adapted for use as a fuel. At the same time these adhesive substances when subjected to heat give out disagreeable and noxious vapors and interfere with the openings between the grate-bars of the furnace in which the fuel thus prepared is used.

The blocks of fuel prepared according to my improvements are free from these evils, as the glutinous adhesive material cannot melt and has no liability to burn faster than the substances with which it is mixed, so that each block or portion of a block retains its solidity until it is gradually consumed, precisely in the same manner as a block of pure coal of the same size.

It will be evident that the glutinous size cannot create any disagreeable smoky vapors, and that it can interfere with the grate-bars to no greater extent than the coal itself.

I do not desire to claim broadly the solidifying of coal-dust, peat, and other like substances by mixing the same with adhesive materials; but

I claim as my invention and desire to secure by Letters Patent—

Compounding and preparing a solidified fuel from coal-dust, peat, and other like substances by mixing the same with glutinous paste, subjecting the composition to pressure in molds, and subsequently drying the condensed blocks, as herein set forth.

In testimony whereof I have signed my name to this specification in the presence of two subscribing witnesses.

E. D. WILLIAMS.

Witnesses:
 HENRY HOWSON,
 CHARLES D. FREEMAN.